US005481737A

United States Patent [19]

Ito et al.

[11] Patent Number: 5,481,737

[45] Date of Patent: Jan. 2, 1996

[54] IMAGE DATA QUANTIZING CIRCUIT WITH A MEMORY FOR STORING UNQUANTIZED AND QUANTIZED IMAGE DATA

[75] Inventors: Akira Ito; Teruo Ishihara, both of Kawasaki, Japan

[73] Assignee: Fujitsu Limited, Kawasaki, Japan

[21] Appl. No.: 32,203

[22] Filed: Mar. 12, 1993

Related U.S. Application Data

[63] Continuation of Ser. No. 528,842, May 25, 1990, abandoned.

[30] Foreign Application Priority Data

May 30, 1989 [JP] Japan .................................... 1-136513
May 30, 1989 [JP] Japan .................................... 1-136515

[51] Int. Cl.[6] .................................................. G06T 1/60

[52] U.S. Cl. .................... 395/800; 348/394; 364/DIG. 1

[58] Field of Search .................................... 395/800, 425, 395/250; 341/76, 143; 348/394, 409, 412, 415

[56] References Cited

U.S. PATENT DOCUMENTS

| | | | |
|---|---|---|---|
| 4,316,222 | 2/1982 | Subramanian | 358/261 |
| 4,878,230 | 10/1989 | Murakami et al. | 375/27 |
| 4,885,787 | 12/1989 | Okamoto et al. | 382/54 |
| 4,949,391 | 8/1990 | Faulkerson et al. | 382/56 |
| 4,951,140 | 8/1990 | Ueno et al. | 358/136 |
| 4,951,143 | 8/1990 | Wachner | 358/160 |
| 4,972,260 | 11/1990 | Fujikawa et al. | 358/136 |
| 5,072,290 | 12/1991 | Yamagami et al. | 358/13 |
| 5,091,782 | 2/1992 | Krause et al. | 358/135 |

OTHER PUBLICATIONS

Rosenfield et al., *Digital Picture Processing*, Academic Press, 1982, pp. 164–177.

*Primary Examiner*—William M. Treat
*Attorney, Agent, or Firm*—Staas & Halsey

[57] ABSTRACT

An image data quantizing circuit that quantizes image data through the use of a 2-port RAM and a quantizing ROM. Pixel data stored in the 2-port RAM functions as an address for the quantizing ROM. The quantized output of the quantizing ROM is stored in the 2-port RAM.

7 Claims, 10 Drawing Sheets

IMAGE QUANTIZING CIRCUIT

IMAGE DATA QUANTIZING CIRCUIT WITH A MEMORY FOR STORING UNQUANTIZED AND QUANTIZED IMAGE DATA

This application is a continuation of application Ser. No. 07/528,842, filed May 25, 1990, now abandoned.

BACKGROUND OF THE INVENTION

This invention relates to an image data quantizing circuit; and more particularly, to an image data quantizing circuit for quantizing a differential pixel block between a current pixel block and a predicted pixel block.

With recent enhanced requirements for high speed image signal processing, it is desirable to realize an image processing coder/decoder (codec) with a digital signal processor. In an image processor, n×n (n=4, 8, 16, . . . ) pixel blocks are transmitted to a transmission line. Before transmission the pixels are band compressed by a differential quantizing process. In a receiver, a recovered image can be obtained by conducting addition with a predicted image block through an inverse quantizing process.

In an effort to realize a high speed image data processor, a 2-port RAM, which has two address input ports and two data output ports, is employed as an image data processor RAM. By employing such a 2-port RAM, read and write processes can be carried out at the same time. Thus, memory access time to the image data processor RAM decreases. When memory access time decreases, the total processing speed of an image data processor can be improved.

In conventional image data processors, however, 2-port RAM circuit structures cannot satisfactorily process the huge amount of image data that must be processed.

SUMMARY OF THE INVENTION

Accordingly, it is an object of the present invention to improve a processing speed of an image data processor.

It is another object of the present invention to provide a 2-port RAM circuit structure that improves the speed of an image data processing.

To achieve the above and other objects, the present invention provides an image quantizing circuit comprising address generating means for receiving first and second address inputs and for generating address outputs based on said first and second address inputs; first memory means for storing pixel data in accordance with at least a first portion of said address outputs, for providing said pixel data as said second address input and for storing quantized pixel data in accordance with another address; and second memory means for storing and providing said quantized pixel data to said first memory means based on said pixel data provided by said first memory means.

DETAILED DESCRIPTION OF THE PREFERRED EMBODIMENTS

Figure 1:
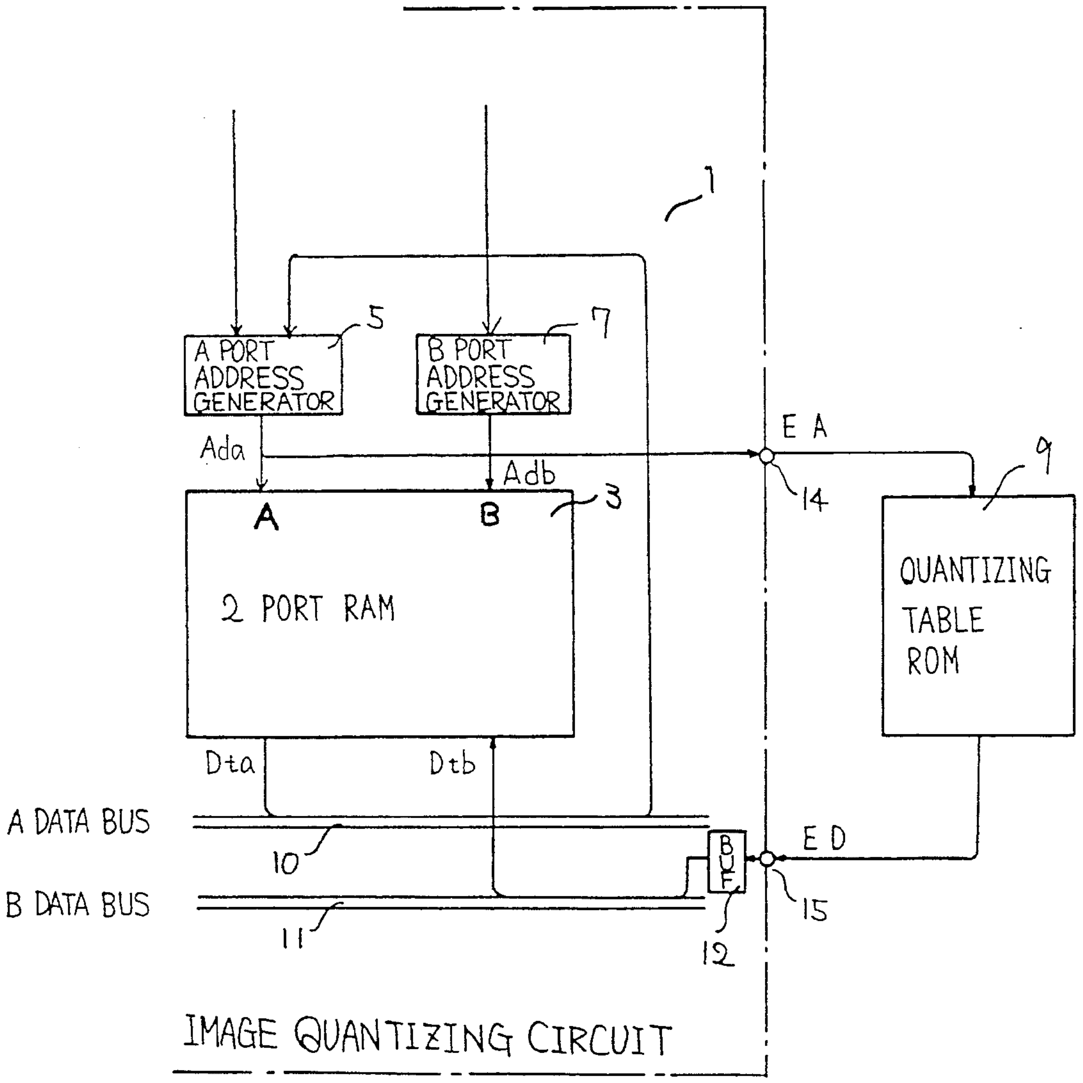
FIG. 1 is a block diagram of a first embodiment of an embodiment image quantizing circuit in accordance with the present invention.

FIG. 1 is a block diagram of an image quantizing circuit. A 2-port RAM 3 has two input/output ports A and B which allow independent accesses to the RAM 3. A port and B port address generators 5, 7 respectively generate addresses for the two ports of the RAM 3. An A data bus 10 carries data of the A port and a B data bus 11 carries data of the B port. Two external extension ports or terminals 14, 15 can be connected to an external circuit, such as a quantizing table ROM 9. External address signals EA are provided to an external circuit such as 9 via terminal 14. External data ED is received from the external circuit 9 via the terminal 15. The external data input from the external data terminal 15 is loaded on the B data bus 11 through a buffer circuit 12. The external circuit or quantizing table ROM 9 is used as a conversion table for quantizing differential pixel data. The quantizing table 9 outputs quantized differential pixel data Dtb when differential pixel data $D_{ta}$ read from 2-port RAM 3 is input as an address to the quantizing table ROM 9.

Figure 2:
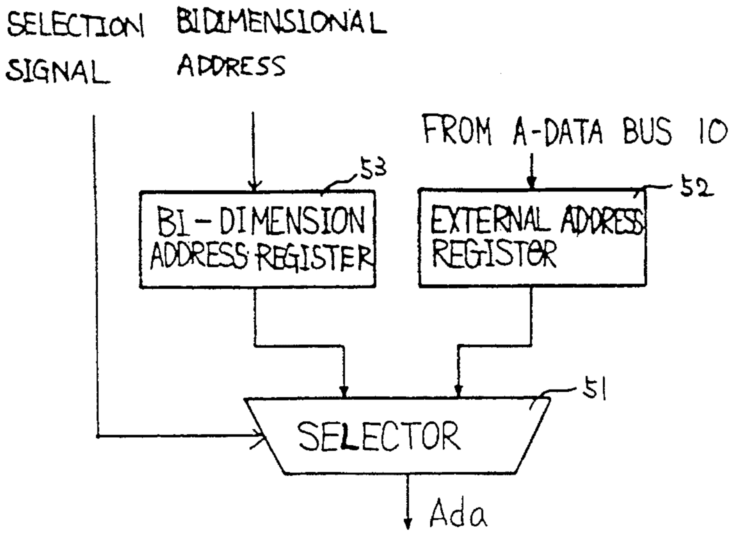
FIG. 2 is a block diagram of an address generating circuit of the FIG. 1 circuit.

FIG. 2 is a block diagram of an address generating circuit of the FIG. 1 circuit. As shown in FIG. 2, the A port address generator 5 includes a bidimensional address register 53. The register 53 stores a bidimensional (x, y) address of an image block within the 2-port RAM 3 that is provided by a processor (not shown). An external address register 52 stores read data Dta from the A data bus 10. This data corresponds to the external address EA. A selector 51 selects one of an output of the bidimensional address register 53 or an output of external address register 52 depending on a selection signal. The output of selector 51 is used as an address of the port A of the 2-port RAM 3 and quantizing table ROM 9.

The structure of the image quantizing circuit 1 shown in FIG. 1 has a reduced number of terminals. It is possible to connect an external extension RAM to the terminals 14, 15 in addition to the quantizing table ROM 9. In such a case, an output from the external address register 52 is provided by the selector 51 as an address to the quantizing table ROM 9. Alternatively, an output from the bidimensional address register 53 is provided by the selector 51 as an address input to the external extension RAM.

Figure 3:
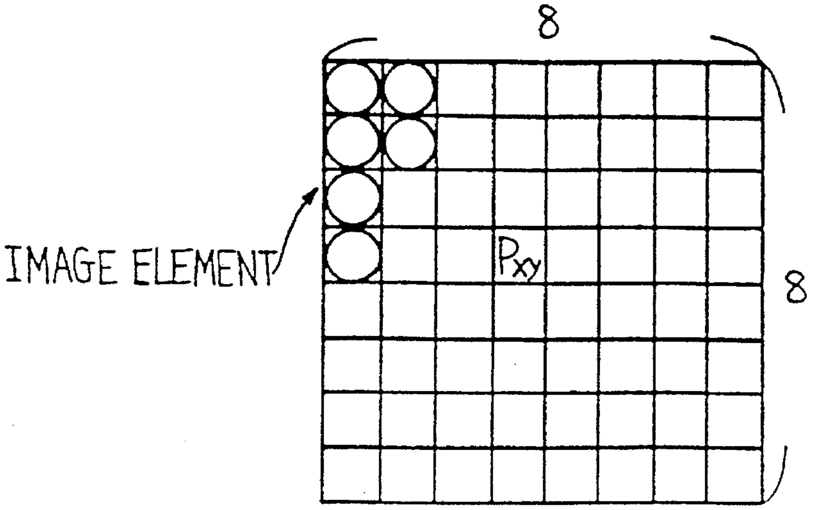
FIG. 3 is a diagram showing a structure of an 8×8 pixel block.
Figure 4:
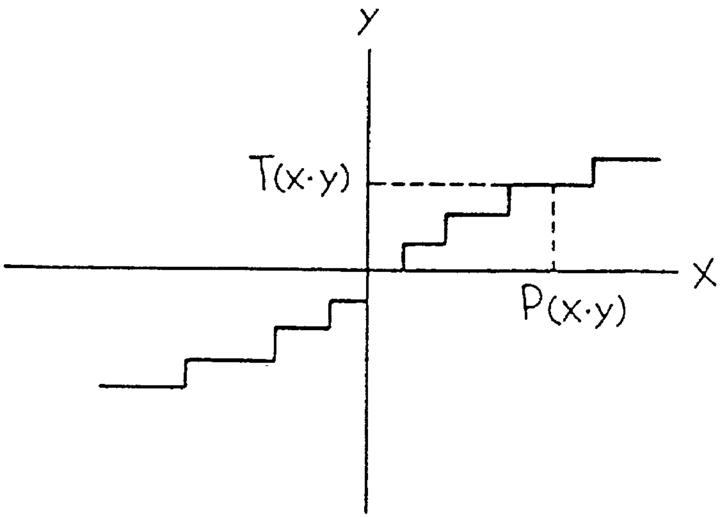
FIG. 4 is a graph showing a quantization characteristic.

The operation of the image data quantizing circuit will be explained hereunder. FIG. 3 schematically illustrates quantization of a pixel block. In FIG. 3, the pixel block is shown as an 8×8 pixel block. Each element in FIG. 3 corresponds to a pixel, and can be represented by for example, 8-bit data. This assumes that the image element is quantized in accordance with the 8-bit data and quantizing characteristic shown in FIG. 4. In FIG. 4, the differential pixel data before quantization is plotted on the horizontal axis, while differential pixel data after quantization is plotted on the vertical axis. In the same figure, pixel data P (x, y) having a bidimensional address (x, y) is quantized into a quantizing value T or quantized pixel data T (x, y). Such a differential quantizing process reduces the total amount of data transmitted. This reduction is with respect to directly transmitting pixel block data and reproducing it in a receiver. Thus, with such a differential quantizing process band compression can be obtained.

Figure 5:
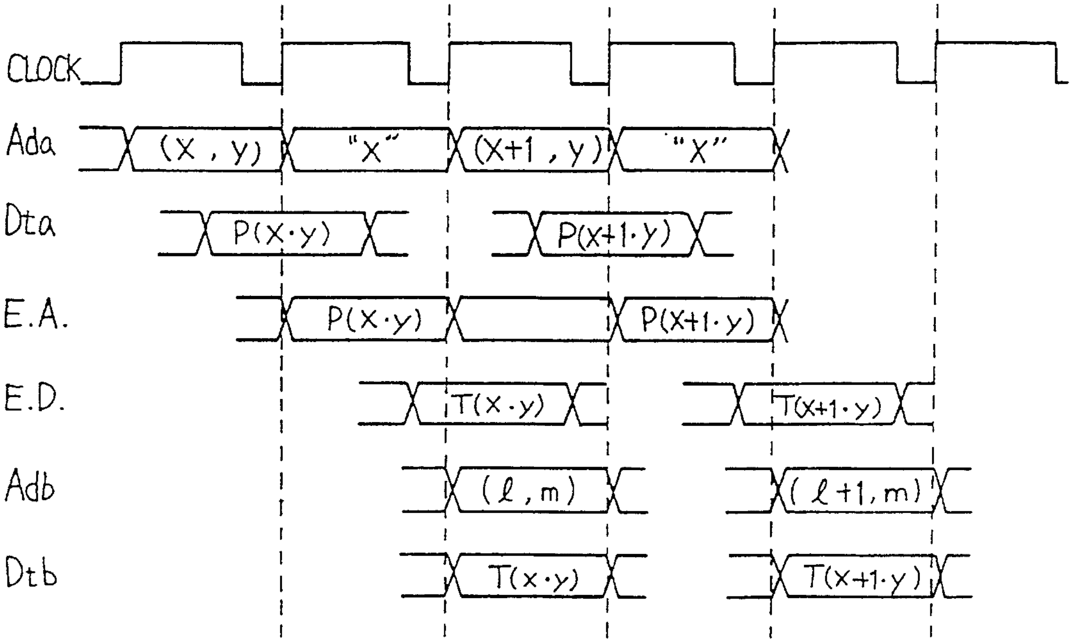
FIG. 5 is a timing diagram for the FIG. 1 circuit.

FIG. 5 is a timing diagram illustrating an example of timing for quantizing n×n pixels within the FIG. 1 circuit. The FIG. 5 timing is based on the differential pixel data being stored in the 2-port RAM 3. In the A port address generator 5. The bidimensional address (x, y) for reading differential pixel data stored in the 2-port RAM 3 is provided to the A port by the bidimensional address register 53 and the selector 53. Thereby the pixel data P (x, y) is read from the A port data output Dta. The pixel data P (x, y) is stored in the external address register 52. In the next clock cycle, the pixel data P (x, y) stored in the external address register 52 is selected by the selector 51 and transmitted to the external quantizing table ROM 9 as the external extension address EA. Then, the quantizing pixel data T (x, y) that corresponds to the pixel data P (x, y) is read out as external data ED from the external quantizing table ROM 9. The quantized pixel data T (x, y) is transmitted to the 2-port RAM 3 through the B data bus 11. The data T (x, y) is stored in the 2-port RAM 3 at the address (l, m). The address is provided by the B port address generating circuit 7. The process described above is repeated n×n times; that is, for each pixel of the pixel block. Thereby quantized pixel blocks are stored in the 2-port RAM 3.

In the image data quantizing circuit of FIG. 1, when the data of one pixel is to be quantized, one clock cycle is needed to access the 2-port RAM 3 in order to read the pixel data to be quantized. Another clock cycle is needed to access the external quantizing table ROM 9 in order to read the quantized pixel data. Therefore, even with a minimum number of clock cycles, the total number of clock cycles to quantize an n×n pixel blocks is 2 (n×n).

Figure 6:
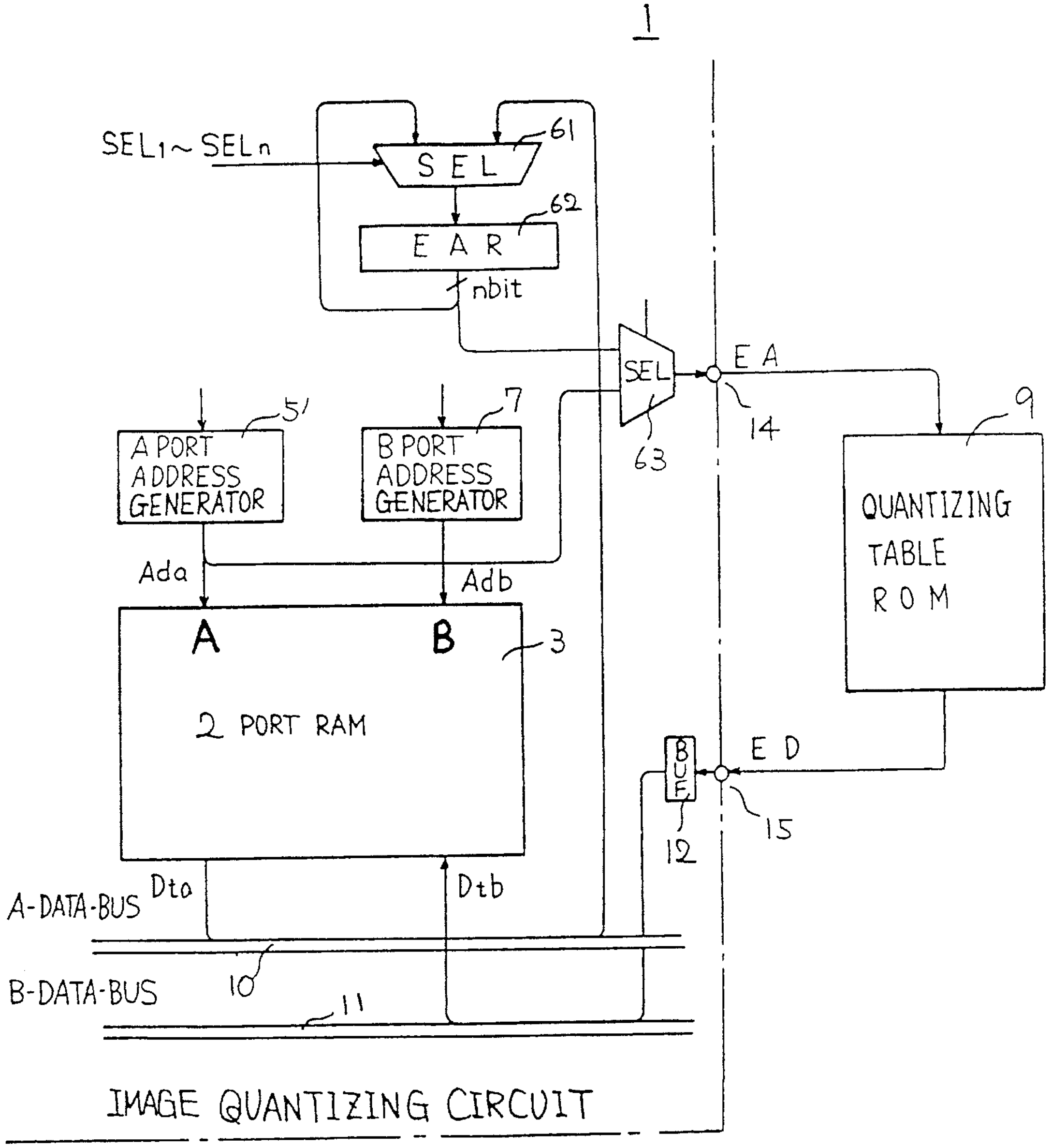
FIG. 6 is a block diagram of a second embodiment of an image quantizing circuit in accordance with the present invention.

FIG. 6 is a block diagram of another embodiment of an image data quantizing circuit in accordance with the present invention. The FIG. 6 circuit has an improved processing speed compared to the FIG. 1 circuit. In FIG. 6, the 2-port RAM 3, B port address generator 7, A data bus 10, B data bus 11, buffer circuit 12, external extension terminals 14, 15 and quantizing table ROM 9 have the same function as those used in FIG. 1.

Unlike the FIG. 1 circuit, in FIG. 6, the pixel data on the A data bus 10 is input to an external address register 62 through a selector 61. The address (Dta) is output to the quantizing table ROM 9 from the external address register 62 through a selector 63. An output from the A port address generator 5' is applied to another input of the selector 63. In addition, each output bit of external address register 62 is applied to the other input of selector 61. The port address generator 5' has the same structure as the bidimensional address register 53.

Figure 7:
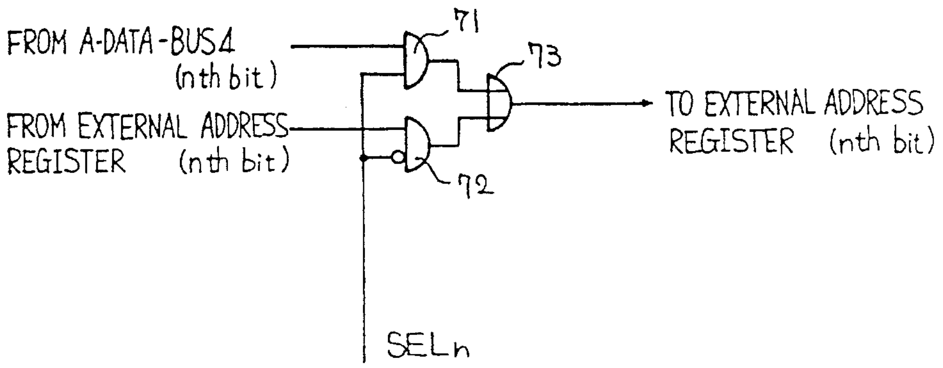
FIG. 7 is a schematic diagram of a portion of the FIG. 6 circuit.

The selector 63 can have a structure such as shown in FIG. 7. Such a structure can be expanded to accommodate any number of bits in the external address register 62, by parallel connecting additional sets of gates such as AND gates 71, 72 and OR gate 73. The AND circuit 72 has an inverted input for the selection signal SELn. In FIG. 7, when the selection signal SELn is "1", an A data bus bit is selected and when the selection signal SELn is "0", an external address register 62 bit is selected. Thereby, any bit of the external address register 62 can be set to "0" by setting the selection signal corresponding to the bit to "0."

Figure 8:
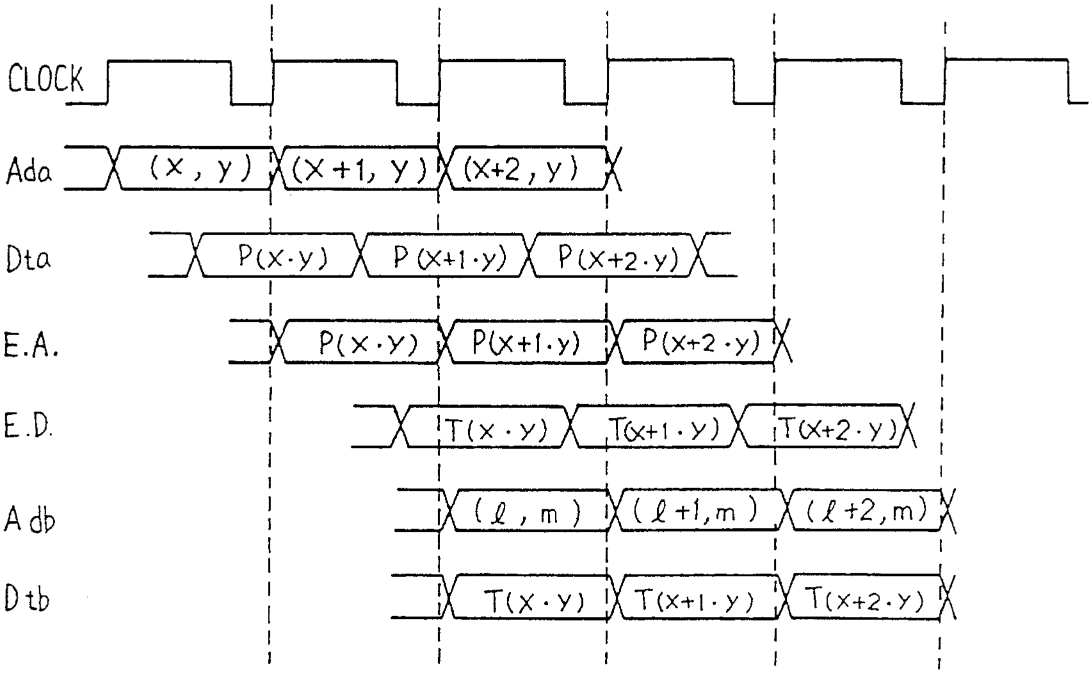
FIG. 8 is a timing diagram for the FIG. 6 circuit.

Operation of the image data quantizing circuit in FIG. 6 is explained below with reference to FIG. 8. FIG. 8 is a timing diagram for a memory access within the FIG. 6 embodiment. First, an initial value that depends on the assignment of external memory addresses is set in the external address register 62 via the A data bus 10 and a processor (not shown). Several of the upper bits of the external address register 62 are fixed by circulation through the selector 61 as noted above. Thus, only a predetermined bit length of pixel data to be quantized is set to the external address register 62 via the data on the A data bus 10 and the selection signals $SEL_1$~$SEL_n$. In this case, the selection signals $SEL_n$ correspond to the upper bits to be set to "0". As a result, these upper bits have no effect on the quantizing by the quantizing table ROM 9. As explained with reference to FIG. 1, the memory addresses of the pixel block to be quantized and the quantized pixel block are respectively assigned to the 2-port RAM 3. The read and write operations of pixel block are carried out simultaneously as indicated in the timing diagram of FIG. 8.

Referring to FIG. 8, during the first clock cycle an address (x, y) is applied to the A port address generator 5' by a processor (not shown). The pixel data P (x, y) corresponding to the address (x, y) is read from the 2-port RAM 3 and written into the external address register 62 through the selector 61. During the next clock cycle, the pixel data P (x, y) is used as the external address EA to read the quantized pixel data T (x, y) from the external quantizing table ROM 9. Simultaneously, the next address (x+1, y) is applied to the A port address generator 5' to access the 2-port RAM 3. The pixel data P (x+1, y) read from 2-port RAM 3 at the address (x+1, y) is applied to the external address register 62.

In the next cycle, the quantized pixel data T (x, y) is written into the 2-port RAM 3 at the address (l, m) designated by the B port address generating circuit 7. Simultaneously, access is made to the quantizing table ROM 9 using the pixel data P (x+1, y) in the external address register 62. Thereby, the pixel data corresponding to the address/coordinates (x, y) of 2-port RAM 3 can be converted to quantized pixel data corresponding to the address/coordinates (l, m).

According to the above, the processing for accessing the 2-port RAM 3 using the pixel data to be quantized and the processing for accessing the external quantizing table ROM 9 using the pixel data read out can be executed simultaneously in parallel in the same clock cycle. Quantizing processing speed is therefore improved. With the above described circuit, upper bits of pixel data, P(x, y), can be set to "0" in accordance with the selection signal SELn. These upper bits that are not needed to address the table ROM 9 are thus available to be used to access the external extension memory. The capacity of external quantizing table ROM can be minimized. The upper bits can be decoded in the external circuit.

Figure 9:
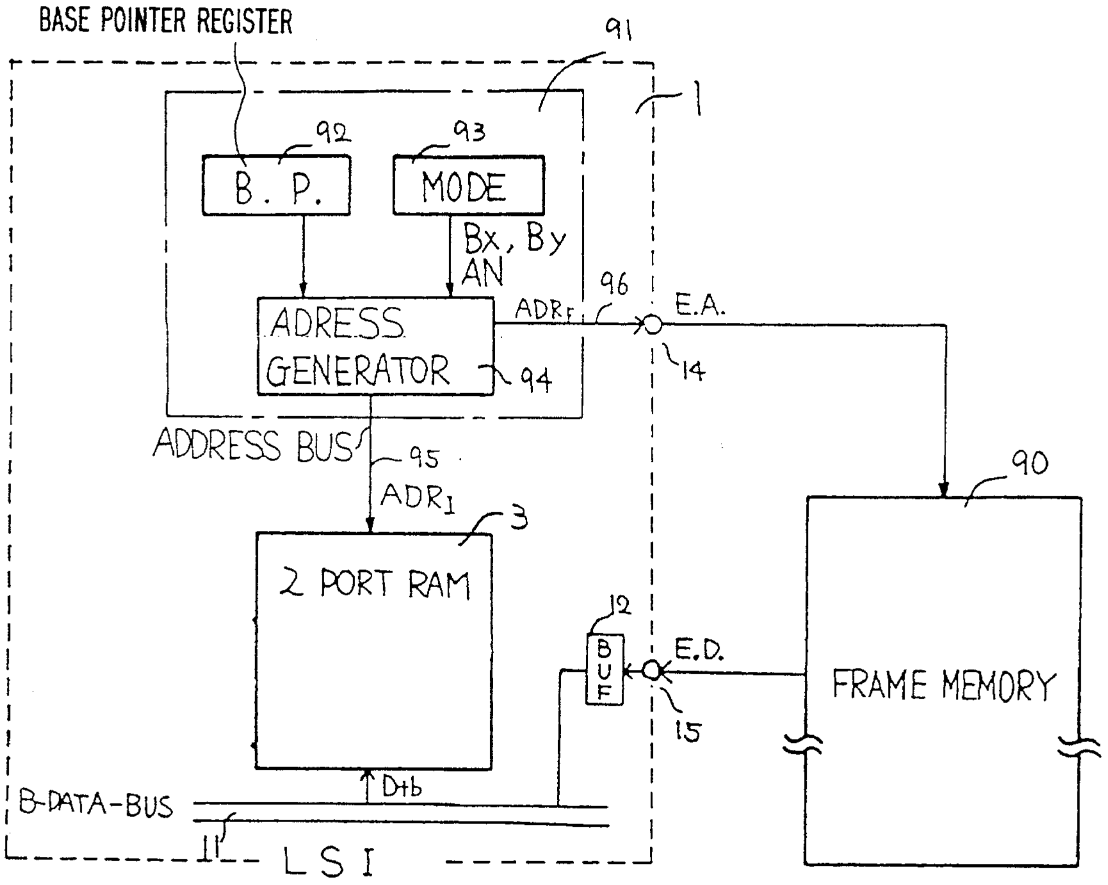
FIG. 9 is a block diagram of an image processing system embodying the present invention.

The following discusses generation of bidimensional addresses. As explained with reference to FIGS. 1 and 6, a quantizing table ROM can be connected to external terminals 14 and 15 as an external memory. As shown in FIG. 9, a frame memory (RAM) can be used instead of the ROM 9.

It is efficient to perform a transfer of image data as a unit, e.g., an n×n pixel block, by DMA (direct memory access) between the external image memory and internal RAM in the image signal processor. This permits highly efficient image encoding. To transfer an n×n pixel block of data, bidimensional addresses must be generated. These addresses need to be generated without complicated program control during image block data transfer between the external image memories and internal RAM.

FIG. 9 is a block diagram of an image signal processing system embodying the present invention. In FIG. 9, the broken line identified by reference numeral 1 is an image quantizing circuit that includes an addressing circuit 91 and the internal 2-port RAM 3. The addressing circuit 91 generates addresses for the internal 2-port RAM 3 and an external frame memory 90. These addresses are respectively output on address buses 95 and 96. The addressing circuit 91 includes a base pointer register (BP register) 92, a mode register 93 and an address generator 94.

The frame memory 90 is an image memory that stores image data representing images picked up by, for example, a camera. The frame memory 90 stores, for example, several frames and provides, for example, image data of current and predicted frames. The internal RAM 3 receives image data from the frame memory 90 so as to effect highly efficient coding. The processed or encoded data is then transferred to the frame memory 90.

Figure 10:
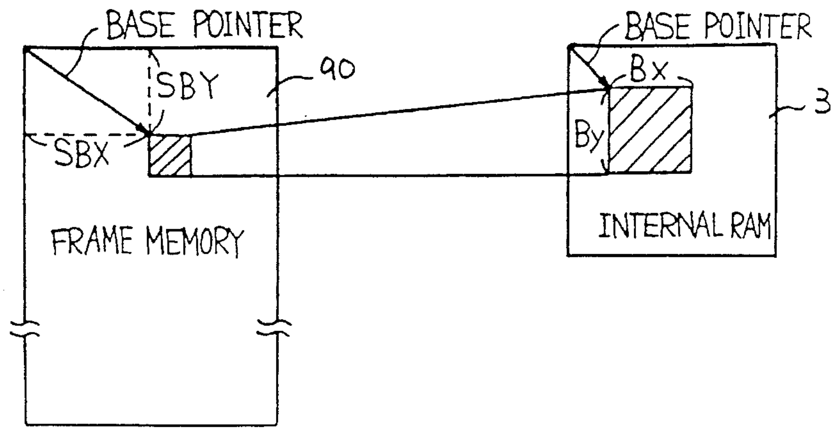
FIG. 10 schematically illustrates data transfer in the FIG. 9 system.

The BP register 92 stores, as a base point, data that is an initial address for the internal RAM 3 and the frame memory 90. This address corresponds to the upper most left address of a pixel block. FIG. 10 schematically illustrates a bidimensional access of the frame memory 90. For DMA access of the frame memory 90, the mode register 93 stores, for example, read/write designation signal R/W, a bidimensional access size (e.g., x direction size $B_x$ and y direction size $B_y$ of the pixel block and a number of access times, etc.). The number of access times is used to determine the timing for refreshing the image memory when implemented using a dynamic RAM.

The address generator 94 generates bidimensional addresses $ADR_I$ and $ADR_F$ of an image block for internal RAM 3 and frame memory 90. These addresses are generated based on the base pointer and block size of image block stored in the BP register 92 and mode register 93. These addresses are respectively applied to the B-port address generator 7 and the bidimensional address register 53 through the address buses 95 and 96.

Figure 11:
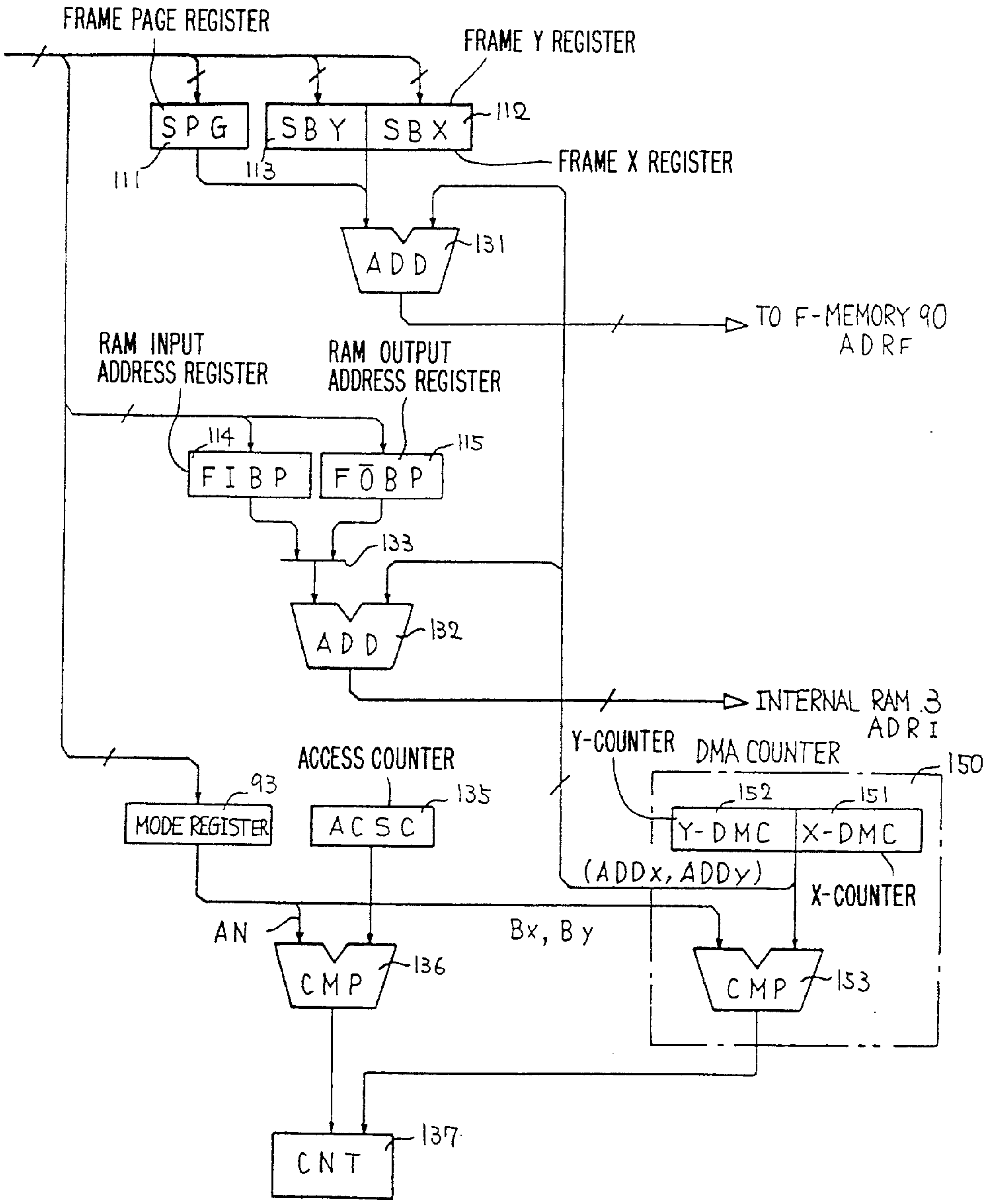
FIG. 11 is a block diagram of an embodiment of the FIG. 9 addressing circuit.

FIG. 11 is a block diagram of an embodiment of the addressing circuit 91. In FIG. 11, a DMA counter 150 sequentially calculates bidimensional addresses, in the x and y directions, for an image block to be transferred such as shown in FIG. 10. These calculations are made on the basis of the contents of mode register 93. The calculated x and y bidirectional addresses are provided as the x direction address $ADD_x$ and y direction address $ADD_y$.

In FIG. 11, the numerals 111 through 115 correspond to the base pointer register 92 of FIG. 9. SPG register 111, SBX register 112 and SBY register 113 designate access points of the frame memory 90, set a page number for display format, X direction position and Y direction position, respectively as the base pointer through. This data determines the heading address when accessing the frame memory 90. The FIBP register 114 and F$\overline{O}$BP register 115 designate access points for the internal RAM 3. The X and Y direction base pointers, at the time of inputting data of the RAM 3 are stored in the FIBP register 114. At the time of outputting, the X and Y direction base pointers are stored in the F$\overline{O}$BP register 115.

The outputs of registers 111, 112 and 113 are applied to an adder 131 and are added to the addresses ($ADD_x$, $ADD_y$) supplied from the DMA counter 150. The result of this addition is applied to the frame memory as address $ADR_F$. The least significant bit of SPG register 111 and the most significant bit of SBY register 113 are selectable by a selector (not illustrated) and thereby a field memory unit such as the frame memory unit 9 can be selected and accessed freely.

Either of the outputs of registers 114 and 115 can be selected by the selector 133 and thus applied to the adder 132. The selected output is then added to the addresses ($ADD_x$, $ADD_y$) supplied from the DMA counter 150. The result of addition is output as the address $ADR_I$ and applied to the internal RAM 3.

An access counter 135 sequentially counts the number of times of access to the memory. An output of this access counter 135 is applied to a count value comparator 136 which compares the access count with the number of access times stored in the mode register 93. When a comparison match results, a matching signal is applied to a control circuit 137. An END signal is applied to this control circuit by the DMA counter 150.

Figure 12:
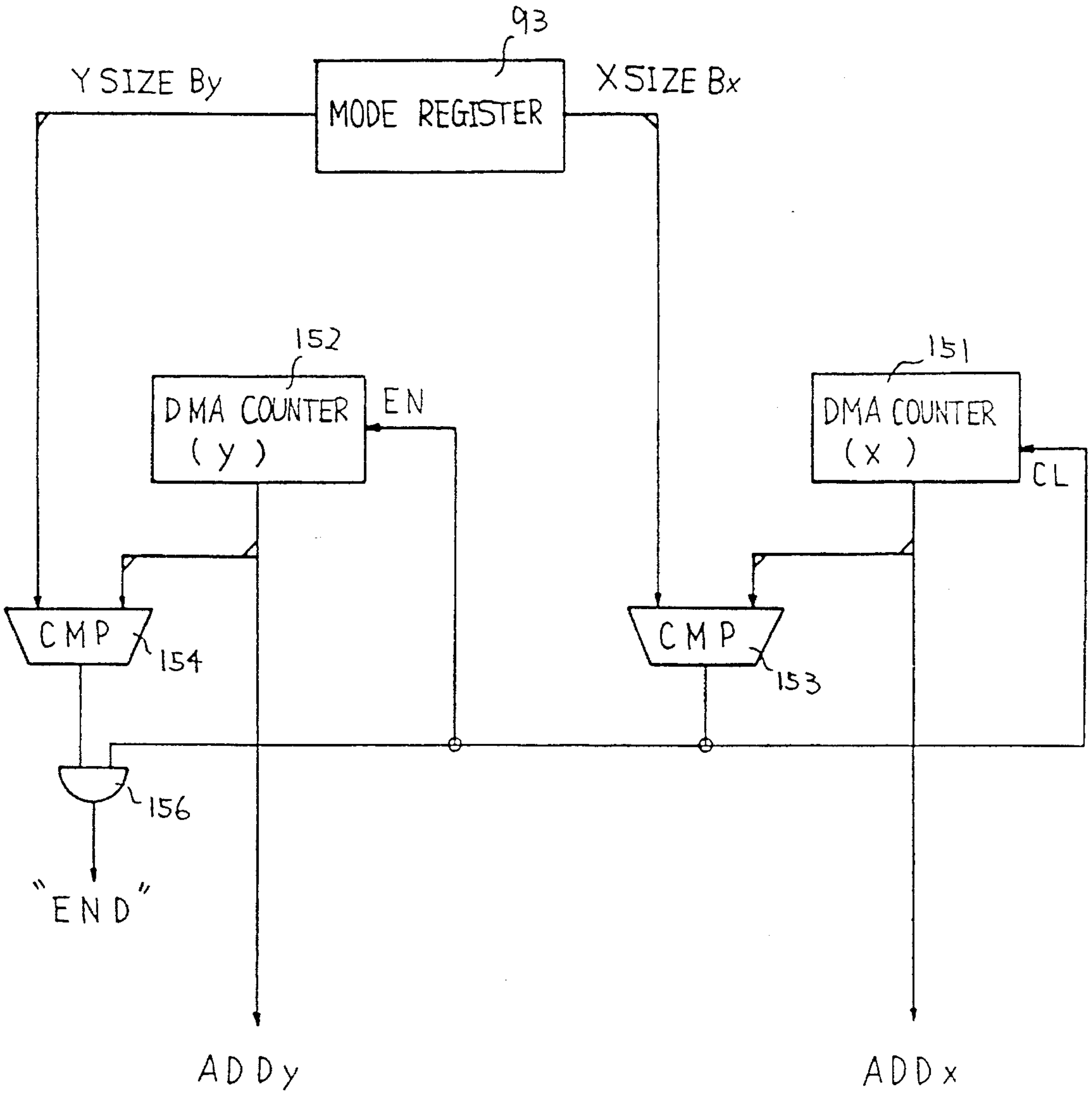
FIG. 12 is a block diagram of a DMA counter in the FIG. 11 addressing circuit.

FIG. 12 is a block diagram of a DMA counter 150 that can be used in the FIG. 11 circuit. An x direction counter 151 sequentially counts up the x direction address $ADD_x$ in the image block, while a y direction counter 152 sequentially counts up the y direction address $ADD_y$ in the image block. The count value of x direction counter 151 is applied to the adders 131, 132 as the x direction address $ADD_x$ and is also applied to the comparator 153. An x direction block size $B_x$ is applied to the comparator 153 by the mode register 93. When the result of the comparison is a match, a matching signal is applied to a clear input terminal of the x direction counter 151, to an enable signal terminal of the y direction counter 152 and to an AND circuit 156. Thereby, when the x direction address $ADD_x$ matches the x direction block size $B_x$ set in the mode register 93, the y direction address $ADD_y$ is counted up by one and simultaneously the x direction address $ADD_y$ is cleared.

The count value of y direction counter 152 is applied to the adders 131 and 132 as the y direction address $ADD_y$ and is also applied to the comparator 154 which compares it with a y direction image block size $B_y$ stored in the mode register 93. When the result of the comparison is a match, a matching signal is applied to the AND circuit 156. The AND circuit 156 detects when counting reaches a final address position in the image block based on receiving matching signals from the comparators 153 and 154. The output of AND circuit 156 is an end signal END that is applied to the control circuit 137. As explained above, the DMA counter 150 sequentially generates the bidimensional addresses ($ADD_x$, $ADD_y$) for the image block.

Operation of the embodiment circuit will be explained below. When a DMA transfer is carried out between the frame memory 90 and the internal RAM 3, the necessary DMA data is set by program control in the BP register 92 and mode register 93 through a bus such as the A data bus 10. Namely, the page number SPG of frame memory 90 is set as the first address of the image block in the BP register, i.e., in SPG register 111. The first positions SBX, SBY in the X and Y directions are set as the base pointer of frame memory 90 in registers 112 and 113 respectively. The first FIBP/F$\overline{O}$BP of input/output of internal RAM 3 are respectively set as the base pointer of internal RAM 3 to the registers 114 and 115. This data selects desired positions of the frame memory 90 and the internal RAM 3. The x direction size $B_x$ and the y direction size $B_y$ of the image block to be accessed, the read/write designation signal R/W and number of access times are stored in the mode register 93.

Thereafter, when the DMA counter 150 is started, it sequentially generates, as explained previously, the bidimensional addresses ($ADD_x$, $ADD_y$) within the designated image block size $B_x$ x $B_y$, based on the contents of mode register 93 and provides these addresses to the adders 131 and 132. As a result, the address $ADR_I$ of the internal RAM 3 is generated by sequentially adding, in the adder 132, the bidimensional addresses ($ADD_x$, $ADD_y$) supplied by the DMA counter 150 to the internal RAM base pointer stored in the register 114 and 115.

Figure 13:
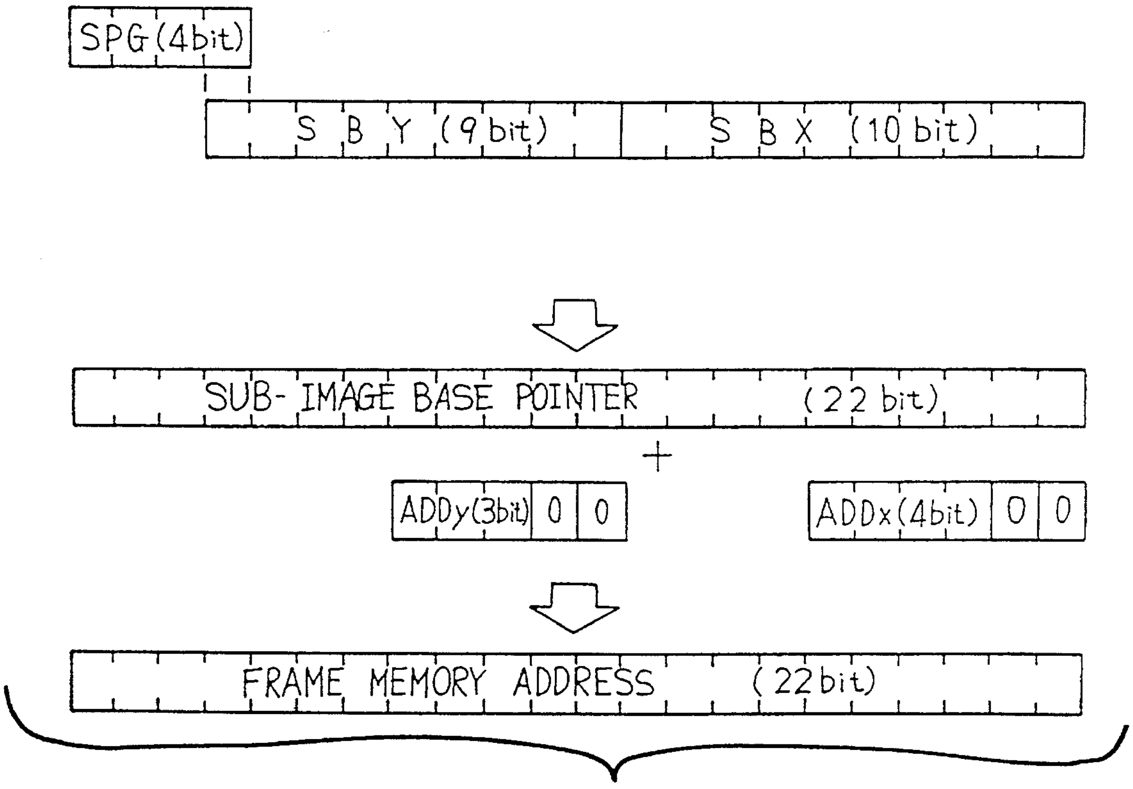
FIG. 13 schematically illustrates frame memory address generation within the FIG. 9 system.
Figure 14:
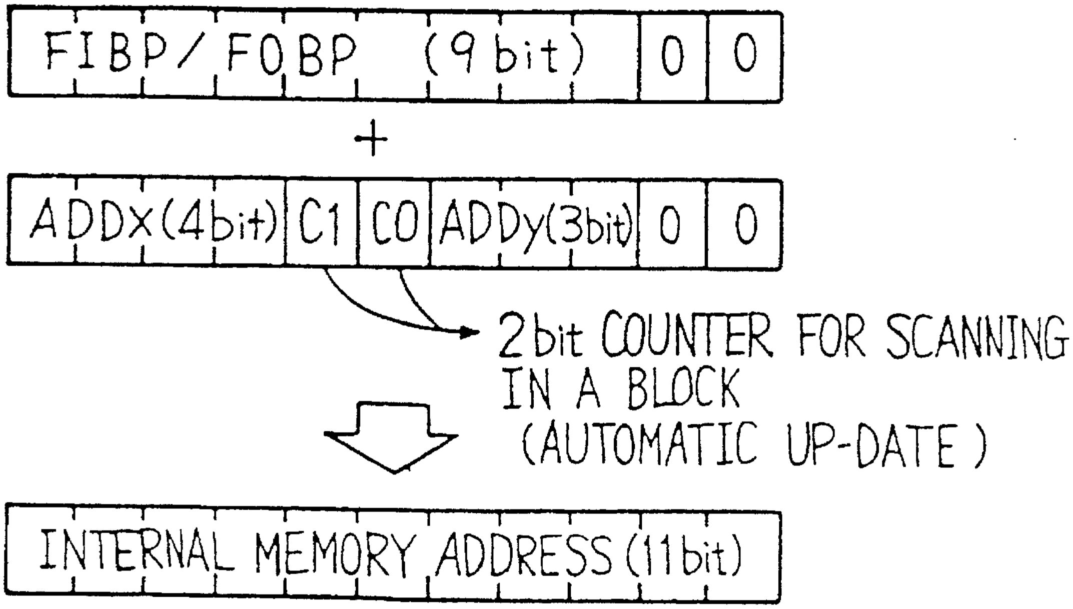
FIG. 14 schematically illustrates address generation for an internal RAM within the FIG. 9 system.

FIG. 13 schematically illustrates frame memory addresses generation. The address $ADR_F$ for the frame memory 90 is generated by sequentially applying, in the adder 131, the bidimensional addresses ($ADD_x$, $ADD_y$) to the frame memory base pointers SBX, SBY. FIG. 14 schematically illustrates address generation for the internal memory 3.

Referring to FIG. 11, the access counter 135 counts up a count value for each memory access. A matching signal is applied to the control circuit 137 via the comparator 136 when such count value in counter 135 matches the number of access times stored in the mode register 93. When a match occurs, the control circuit 137 temporarily stops direct memory access. During this period, the frame memory (DRAM) can be refreshed by external refresh circuits.

As explained above, generation of bidimensional addresses to access image data of a desired display format size can be realized in hardware. A direct memory access transfer can easily be realized by setting a base pointer register and mode register.

An addressing circuit such as circuit 91 can be used as an addressing circuit in FIGS. 1 and 6 to provide a read address Ada and a write address Adb of 2-port RAM 3. In such a case, SPG register 111, SBY register 113 and SBX register 112 are used with FIBP register 114, F$\bar{O}$BP register 115 and OR/selector 133. The output of ADD 131 is connected to A port address generator 7 and output of ADD 132 is connected to B port address generator 5 or 5'. Thus, the output of ADD 131 is the read address Ada for 2-port RAM 3 and the output of ADD 132 is the write address Adb for 2-port RAM 3. In addition, as can be seen from FIG. 8, the corresponding data, Dtb, is obtained after less than two clock cycles delay. Also, $ADD_x$ from DMA counter 151 and $ADD_y$ from DMA counter 152 are input to ADD 131 after less than two clock cycles.

In FIG. 6, selector 63 selects Ada from A port address generator 5' for E.A. in case of connecting frame memory 90 as an external memory.

It is not intended to limit the present invention to the embodiments described, instead the scope of the present invention is defined by the following claims.

We claim:

1. An image quantizing system, comprising:

an image quantizing circuit, comprising:

an address generator generating first and second addresses; and an internal memory, connected to said address generator, storing pixel data to be quantized in a first portion, outputing from said first portion said unquantized pixel data responsive to said first address and storing in a second portion differentially quantized pixel data responsive to the second address; and an external memory, connected to said internal memory, storing said differentially quantized pixel data corresponding to said unquantized pixel data and outputing said differentially quantized pixel data to said internal memory means responsive to said unquantized pixel data being used as a memory address and provided by said internal memory means.

2. An image quantizing system, comprising:

an image quantizing circuit, comprising:

an address generator generating first and second addresses; and an internal memory, connected to said address generator, storing pixel data to be quantized in a first portion, outputing from said first portion said unquantized pixel data responsive to said first address and storing in a second portion differentially quantized pixel data responsive to the second address, said internal memory comprising a 2-port RAM and said 2-port RAM simultaneously outputs said unquantized pixel data and stores said differentially quantized pixel data; and an external memory, connected to said internal memory, storing said differentially quantized pixel data corresponding to said unquantized pixel data and outputing said differentially quantized pixel data to said internal memory means responsive to said unquantized pixel data being used as a memory address and provided by said internal memory means.

3. An image quantizing system, comprising:

an image quantizing circuit, comprising:

an address generator generating first and second addresses; and an internal memory, connected to said address generator, storing pixel data to be quantized in a first portion, outputing from said first portion said unquantized pixel data responsive to said first address and storing in a second portion differentially quantized pixel data responsive to the second address; and an external memory, connected to said internal memory, storing said differentially quantized pixel data corresponding to said unquantized pixel data and outputing said differentially quantized pixel data to said internal memory means responsive to said unquantized pixel data being used as a memory address and provided by said internal memory means, and wherein said address generator comprises:

a first register for said first address;

a second register operatively connected to receive said unquantized pixel data provided by said internal memory; and a selector selectively providing one of said unquantized pixel data as the memory address and said first address to said external memory.

4. An image quantizing system, comprising:

an image storage circuit, comprising:

an address generator generating first and second addresses; and an internal memory simultaneously storing unquantized and differentially quantized image data in accordance with said first and second addresses;

a quantizing ROM converting said unquantized image data to said quantized image data; and an external frame memory, connected to said internal memory, storing said differentially quantized image data and providing said unquantized image data to said first memory based on said first and second addresses.

5. An image quantizing system, comprising:

an image storage circuit, comprising:

an address generator generating first and second addresses; and an internal memory simultaneously storing unquantized and differentially quantized image data in accordance with said first and second addresses;

a quantizing ROM converting said unquantized image data to said quantized image data; and an external frame memory, connected to said internal memory, storing said differentially quantized image data and providing said unquantized image data to said first memory based on said first and second addresses, and wherein said address generator comprises:

a base point register storing and providing a pointer identifying a block of image data within said external frame memory;

a mode register storing and providing a size of a block of image data within said external frame memory; and an address calculating unit calculating said addresses responsive to said pointer and said size and controlling a DMA access of said external frame memory.

6. An image quantizing system according to claim 5, wherein said address calculating unit includes an access interruption unit periodically interrupting access to said external frame memory allowing said DMA access.

7. An image quantizing system, comprising:

an image quantizing circuit, comprising:

an address generator generating first and second addresses; and an internal memory, connected to said address generator, storing pixel data to be quantized in a first portion, outputing from said first portion said unquantized pixel data responsive to said first address and storing in a second portion differentially quantized pixel data responsive to the second address;

an external memory, connected to said internal memory, storing said differentially quantized pixel data corresponding to said unquantized pixel data and outputing said differentially quantized pixel data to said internal memory means responsive to said unquantized pixel data being used as a memory address and provided by said internal memory means; and an external frame memory outputing said unquantized pixel data to said internal memory and inputing said differentially quantized pixel data from said internal memory; and a direct memory address generator automatically generating input and output addresses for said internal memory and said external frame memory.

* * * * *